United States Patent [19]

Pujol

[11] Patent Number: 4,541,660
[45] Date of Patent: Sep. 17, 1985

[54] AUTOMATIC MACHINE FOR BINDING PRODUCTS IN ACCORDANCE WITH A PRE-ESTABLISHED SEQUENCE

[76] Inventor: Yves Pujol, 15 rue Plantevin, 81000 Albi, France

[21] Appl. No.: 442,454

[22] Filed: Nov. 17, 1982

[30] Foreign Application Priority Data

Nov. 20, 1981 [FR] France ................ 81 22112

[51] Int. Cl.⁴ .............. B65F 61/14; B65H 69/04
[52] U.S. Cl. ................................. 289/2; 17/34; 289/18.1
[58] Field of Search ............ 289/2, 18.1; 17/34

[56] References Cited

U.S. PATENT DOCUMENTS

| | | | |
|---|---|---|---|
| 3,318,623 | 5/1967 | Barroso | 289/18.1 X |
| 3,583,131 | 6/1971 | Gaudlitz | 289/18.1 X |
| 3,940,169 | 2/1976 | Kock | 289/18.1 X |
| 4,313,630 | 2/1982 | Barroso | 289/18.1 X |
| 4,401,329 | 8/1983 | Pedroia | 289/18.1 |

FOREIGN PATENT DOCUMENTS 2080304 11/1971 France ................ 289/18.1

*Primary Examiner*—Louis K. Rimrodt
*Attorney, Agent, or Firm*—Eric P. Schellin

[57] ABSTRACT

An automatic machine for forming "capstan knots" on casings for products such as sausages includes first and second stations, wherein the casings are advanced through the first station and a continuous strand for tying the capstan knots is advanced through the second station. The strand is displaced in the second station to form a strand surrounded area which receives an empty portion of one of the casings and is closed about the empty portion to form the capstan knot. The strand is cut after the knot is formed.

8 Claims, 10 Drawing Figures

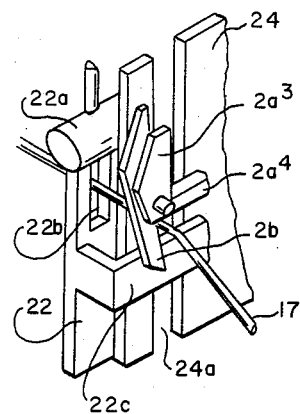
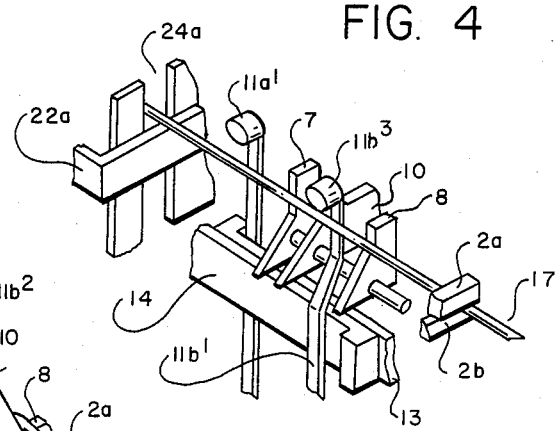
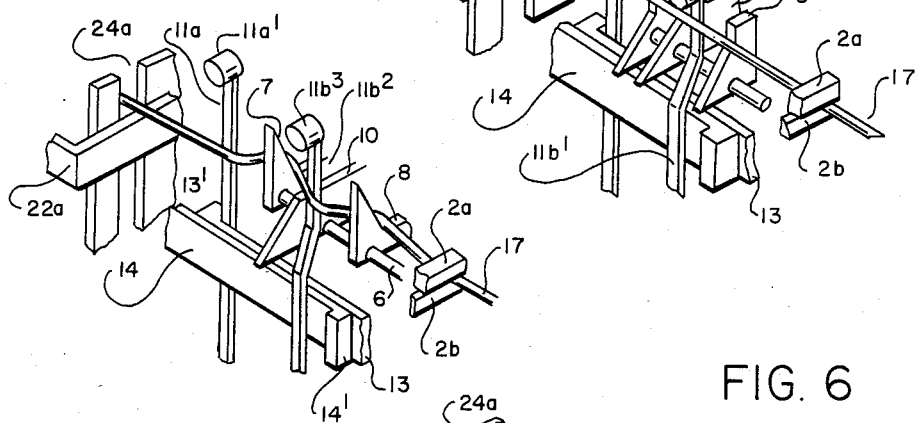
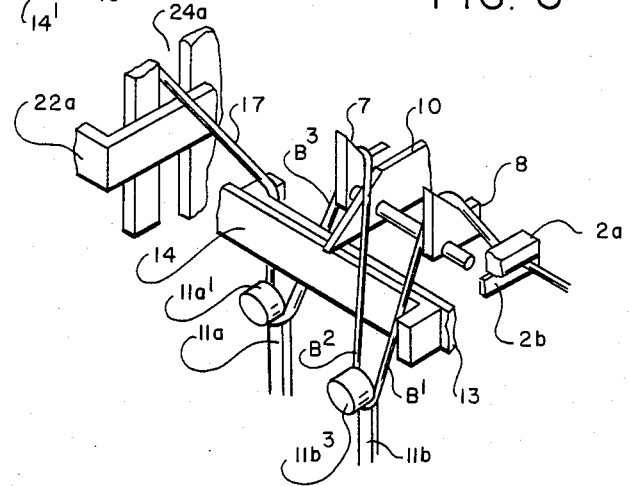

AUTOMATIC MACHINE FOR BINDING PRODUCTS IN ACCORDANCE WITH A PRE-ESTABLISHED SEQUENCE

The object of the invention is an automatic machine for binding by means of a thread, twine or the like solid or hollow products in accordance with a pre-established sequence.

In a non-restrictive implementation, the invention is used for manufacturing fresh or dry sausages and other similar products, the binding which is performed being obtained by means of a self-locking knot, in the manner of a capstan knot.

Automatic machines are already in existence for tying up the fresh or dry sausages and other similar products by binding the ends of the product by means of a knot which is called a "capstan knot". Such machines have been described for instance in the French Patent Application Nos. 2.334.300, 2.367.429, 2.435.910 and 2.447.148, filed in the name of the Applicant for the present invention, and in which the Applicant is named as the Inventor. According to the methods disclosed in said prior art, the products are tied up by means of a capstan knot, and the twine is cut off by suitable means when the knots have been made. It is necessary then to proceed with a manual handling by knotting two free ends of twine for fresh and dry sausages or similar products, in order to be able to use these tied ends or connection means as means for hanging up the products. On the other hand, with the machines in accordance with the prior art referred to, an operator is necessary for presenting the product in the binding area, and for holding the product while same is being tied up.

The object of the present invention is to eliminate these drawbacks and to provide an automatic machine capable of being operated without the necessity of further manual handling afterwards.

A further object of the invention has been the provision and the embodiment of an automatic machine permitting the cutting to lengths of the strings of fresh sausages, dry sausages, or similar products, and the knotting steps to be combined in order to obtain various kinds of merchandized products, with the possibility to cut the twine, for instance, at every knot, every two knots, four knots, or otherwise, as required.

For the sake of simplicity, the expression "thread" or strand will be understood in a generic manner for any convenient tie, thread, twine, small cord, band, etc.

In accordance with a first characteristic of the invention, the machine is remarkable in that automatisms are included therein which permit the continuous supply of the knotting thread, the shaping of the thread in view of the binding to be effected, the continuous presentation of the products to be bound, the severing of the ends of each product, the binding of each one of the ends and the cutting, in accordance with a pre-established pitch, of one or more products in a string bound by the thread, without manual intervention.

In accordance with a further characteristic of the invention, the machine is remarkable in that said machine is comprised of a main framework which is contoured and arranged for supporting the mechanisms of the machine, as well as the guide and linking means thereof, said means being:

a mechanism for controlling the feed and the distribution of the thread;

a mechanism for clamping the thread and for paying off same towards the interlacing area along a controlled rectilinear path to form the binding;

a mechanism for shaping the thread in view of the binding, by successive and complementary distortions of the path thereof in various directions relative to the initial rectilinear path, in order to bind the products in the form of a so-called "capstan knot";

a mechanism for gripping the product to be bound and for positioning it within the binding area by means of a controlled translation normal to the initial rectilinear path of the thread;

a mechanism for placing the binding on the product;

a mechanism providing a double function in accordance with the position thereof: on the one hand, presentation of the thread toward the tightening mechanism, and on the other hand tightening of the knot after the binding has been placed on the product;

a mechanism for the presentation of the product to be bound, movable in a direction normal to the direction of movement of the thread-clamping mechanism and in a direction parallel to the latter, a cutting device severing the product to be bound during the first movement of the mechanism;

a thread cutting tool.

These and further characteristics will be apparent from the following description.

In order to make the subject matter of the invention better understood, without however restricting it thereby, in the drawings:

FIGS. 3, 4, 5, 6, 7, 8 and 9 are partial views on a larger scale, illustrating the positioning of the mechanisms at the various stages of the knot forming sequence;

Figure 1:
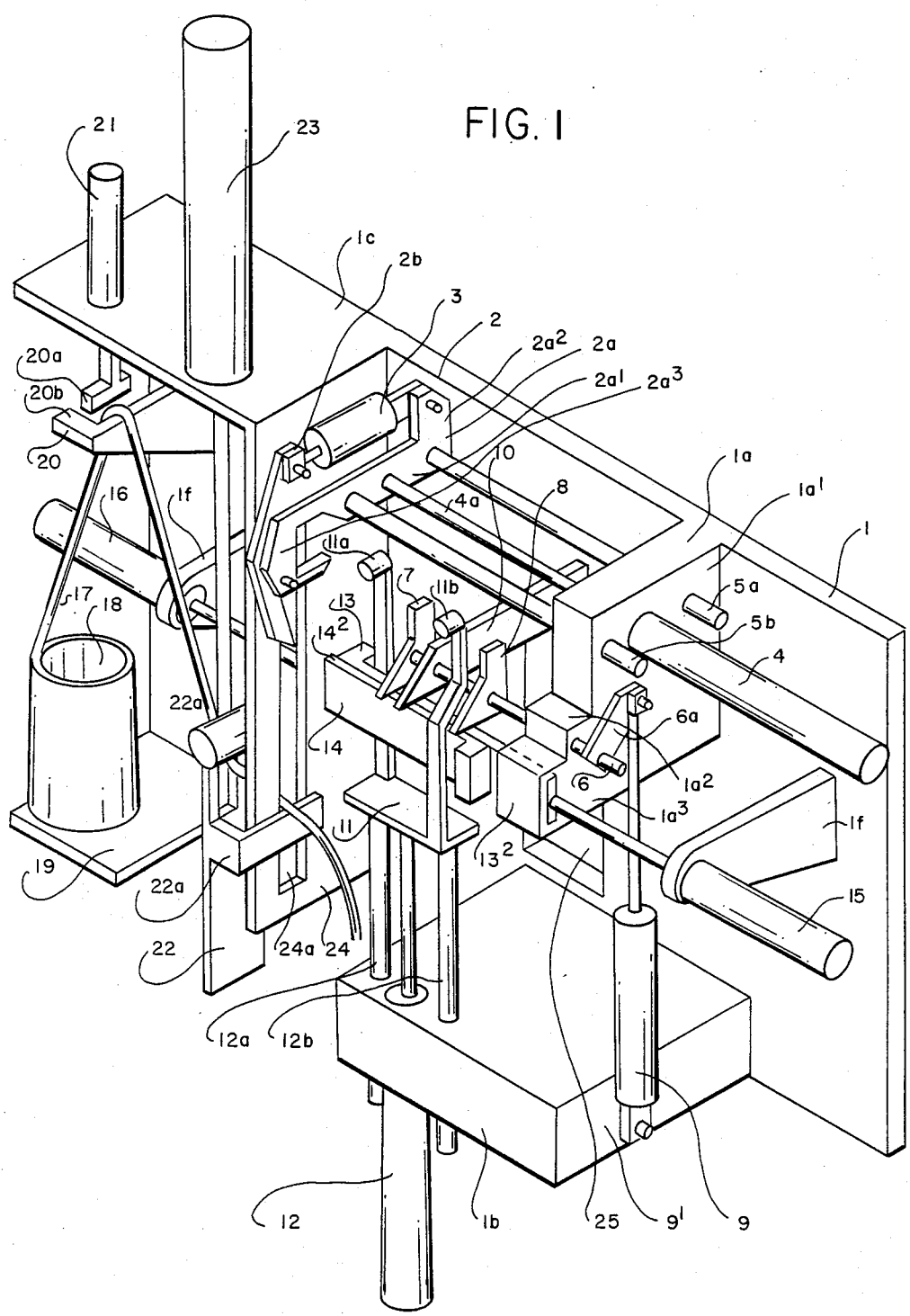
FIG. 1 is a perspective view illustrating in the inactive position the whole of the mechanism for the implementation of a binding at a first station in order to obtain a so-called "capstan knot" and the tightening of the knot; some means such as the stripping device being omitted in this Figure to make the invention easier to understand.

The automatic machine for binding fresh sausages, dry sausages and the like includes a framework (1) which is shaped and arranged for accomodating various mechanisms and the guiding and linking means thereof.

The following devices are supported essentially by the framework (1) and these devices will be described in greater detail successively: the thread-supplying devices, the thread-clamping device, the thread-positioning device prior to the binding, the knot-tightening device, and the stripping block at a first station which is the knotting station.

The thread-clamping device (2) is comprised of a fixed jaw (2a) and of a movable jaw (2b). The fixed jaw (2a), which is contoured accordingly, includes a medial portion (2a1) which is extended at the ends thereof by two opposite, oriented wings (2a2) and (2a3) respectively, the wing (2a3) defining the jaw portion which has a backwards turned horizontal extension (2a4). The movable jaw (2b) is in the form of a contoured section which come in juxtaposition upon one of the faces of the wing (2a3) of the fixed jaw. This movable jaw (2b) is made fast by the upper end thereof with the rod of a pressure cylinder (3) which is in turn connected by the fastening point thereof with the upper wing (2a2) of the fixed jaw. The whole thread-clamping device (2) is moved transversely by the action of a pressure cylinder (4). The rectilinear guiding is obtained by means of cylindrical and parallel rods (5a–5b) disposed on either side of the rod of the pressure cylinder (4) and slidingly within convenient apertures provided within the thickness (1a1) of a block (1a) formed on the framework (1) within a plane normal to the vertical rear plane thereof. This block (1a) has a staged front structure, more particularly with the portions (1a1), (1a2), (1a3). The rods (5a–5b) and the rod (4a) of the pressure cylinder (4) are made fast with the medial portion (2a1) of the fixed jaw.

This thread-clamping device (2) which has thus been described provides for each sequence, in co-operation with driving means, an opening and closing of the jaws (2a–2b) between which the thread strand (17) is positioned, as well as a return translation of the assembly. In the initial position, this device permits the thread to be gripped, while in the end position of shifting permits the thread to be presented in front of the mechanism for the implementation of the binding, and this mechanism will be now described.

The elements of this mechanism are described with respect to the horizontal position of the thread (17) which is to be used for defining the binding. Said mechanism includes two thread-lifting fingers (7) (8), two hooks (11a) and (11b) for pulling the thread (17) downwards, and two blades (13) (14) for pulling the strands of the yarn laterally. The thread-lifting fingers (7) (8) are interdependent or not and are secured to a shaft (6) parallel with the travelling direction of the thread-clamping device (2). The two fingers (7) (8) are disposed on either side of a stationary finger (10) connected in a suitable manner with the framework (1). The shaft (6) is rotated within a bore provided in the stationary finger (10) and within a bore provided in the portion (1a2) of the block (1a) of the framework. The shaft (6) is integral with a small linking rod (6a) which is in turn connected with the rod of a pressure cylinder (9) disposed vertically, the fastening point (9$^1$) of which is connected with a horizontal supporting plane (1b) of the framework (1), situated above the block (1a). This pressure cylinder (9), when the rod thereof is developed, permits a pivoting motion to be transmitted to fingers (7 and 8) for lifting said fingers in order to hook up the thread and to modify thereby the path of the thread, as described later. These fingers (7 and 8) have on their thread-hooking face a ramp forming "V"-shaped configuration permitting to hook up said thread and to hold it in an uplifted position.

This mechanism includes moreover two hooks (11a–11b) for pulling downwards the thread (17) in a direction normal to the direction of translation of the thread-clamping device (2). These hooks are in the form of contoured small bars made fast at their lower portion with a plate (11). These small bars are disposed at the opposite angular ends of the plate (11), so that they will be situated on either side of the blades (13–14). The small bar (11a) has a straight shape terminating at the upper end thereof in a horizontal and front cylindrical boss (11a1), said small bar, as viewed in the drawings, being located at the left of the lifting finger (7). The small bar (11b) has beyond the medial portion thereof an offset (11b1) which is extended by a vertical end (11b2) disposed in a plane different from the plane of the straight shape of the small bar (11a) and terminating then in a horizontal and front cylindrical boss (11b3). The upper portion of the small bar (11b) is situated between the stationary finger (10) and the lifting finger (8). The small bars or hooks (11a–11b) can be shifted vertically by means of a pressure cylinder (12) the rod of which is integral with the plate (11). Cylindrical and parallel rods (12a–12b) are integral with the plate, and provide the rectilinear guiding thereof, said rods sliding within the aforesaid horizontal block (1b) integral with the framework (1).

Figure 7:
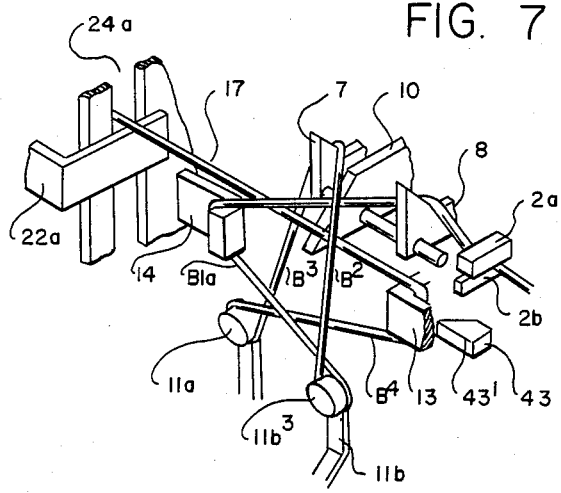
Figure 8:
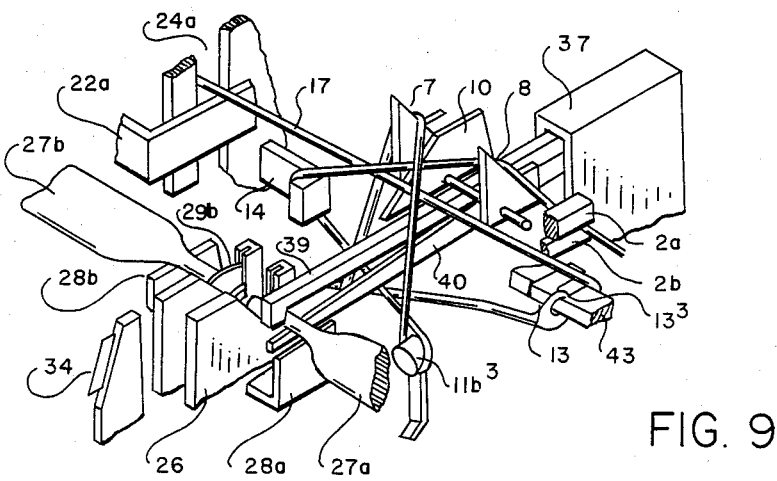
Figure 9:
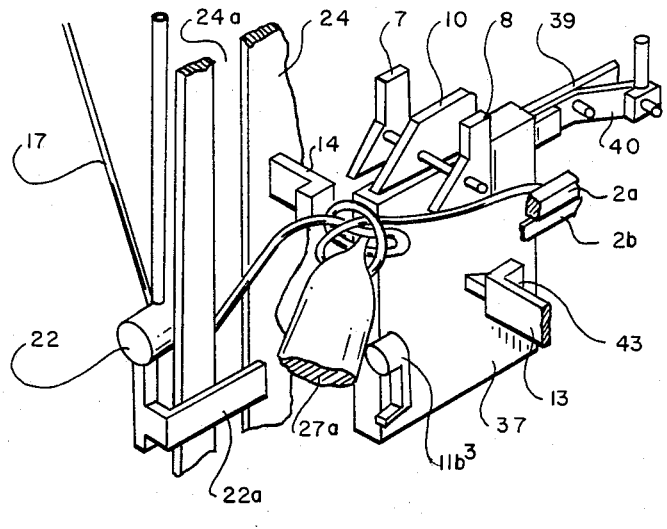

The mechanism includes also two blades (13–14), horizontal and juxtaposed one against another and movable in an opposite translation movement by the action of the pressure cylinders (15) and (16), in a direction parallel to the shifting direction of the thread-clamping mechanism. The pressure cylinders (15) (16) are made fast with the framework by means of squares (1f). The blades (13) (14) have each one at one end thereof a squared wing (13$^1$) (14$^1$) respectively, oriented in an opposite manner one to another, while their other ends (13$^2$) and (14$^2$) are arranged to be coupled with the rods of the pressure cylinders (15) (16). In the inactive position, the wings (13$^1$) and (14$^1$) of the blades are situated within planes between which the hook (11a), the lifting finger (7), the stationary finger (10), the hook (11b) and the lifting finger (6) are disposed in succession. On the other hand, it will be noted that the wing (13$^1$) of the blade (13) is recessed along a guide slot (13$^3$) for the passage of the thread and for permitting, during the translation of the blade (13), the thread unhooking nose (43) to be fixed as illustrated in FIGS. 7, 8 and 9. This unhooking nose (43) is secured to the framework in any desired manner, directly or indirectly. On completion of the separating stroke of the blades (13) (14), the unhooking nose (43) penetrates into the recess and lifts up the thread pulled by the wing (13$^1$), cancelling this its hooking function. As will be apparent, the blades are associated with driving means providing, in accordance with an operational sequence, limit positions for these blades. In the initial position, the two blades (13) (14) are in juxtaposition, and then, in the extreme position, they are separated from one another, after hooking by means of their squared wing some thread strands which will be specified later with the description of the operation of the machine.

There will be described now the device for bringing the thread towards the thread-clamping device (2) described previously, and the knot-tightening device as well.

To begin with, the framework (1) comprises adjacent to one of the ends thereof a horizontal plane or support (19) on which the ball of thread (18) is positioned, the thread (17) being paid off from this ball in accordance with a suitable movement. The framework (1) has within a plane higher than the support (19) an upper plate (1c) which is extended at the right, as viewed in FIG. 1, by a vertical wall (24) connected to the framework (1). The upper plate (1c) is arranged to receive two pressure cylinders (21–23). The square rod of the pressure cylinder (21) forms the movable jaw (20a) of a press (20), the stationary jaw being defined by a contoured arm on which the thread (17) is paid off, said arm being conveniently secured to the framework, and the thread (17) being passed freely between the jaws when the pressure cylinder (21) is not actuated.

Concerning the knot-tightening device, this device includes essentially a contoured plate (22) actuated for vertical shifting by the action of the pressure cylinder (23) mounted on the plate (1c) of the framework. The aforesaid plate is arranged to have at the upper end thereof a cylindrical idler boss (22a) beneath which a port (22b) for the passage of the thread is provided within a medial plane and partly along the whole length of the plate. Moreover, the plate (22) has a horizontal offset arm (22c) intended for passing round the vertical wall (24) of the framework in order to cover this wall in part to a depth such that said arm could be presented in front of the vertical port (24a) provided in said wall (24), the thread (17) bearing ahead beneath the cylindrical boss (22a) and being guided successively through the ports (22b) and (24a) for abutting on the arm (22c).

As will be apparent, the knot-tightening device cooperates with driving means causing this device to be shifted at each operational sequence, in a direction parallel with the direction of the small bars (11a–11b).

The aforesaid device has in accordance with the position thereof a double function: in the upper position, this device presents the thread (17) into the thread-clamping device (2); in the lower position, this device provides the tightening of the knot by the increase of the path of said thread (17) in abutment on the cylindrical boss (22a), as this will be described later.

The stripping block of the machine will be described now. The purpose of this stripping block is to cause the strands of the thread to fall at a precise time around the product to be bound. This block is designated at (37), as best seen in FIG. 2, and is mounted slidably within an opening (25) formed within the framework (1), this opening being illustrated in FIG. 1. The stripping block slides by the action of a pressure cylinder (38) secured in a suitable manner to a squared support (1d) integral with the framework (1). The stripping block has on the front face ($37^2$) thereof a T-shaped opening ($37^1$) through which the jaws of pincers (39) for gripping the product to be bound can be shifted. These pincers (39) include a stationary jaw (39a) and a movable jaw (39b), the opening of one jaw relative to the other one being controlled by a pressure cylinder (41). The pincers body (39) is extended at the rear end (40) thereof to be made fast with the rod of a pressure cylinder (42) so that said body will be caused to move transversely within the interior of and to project externally from the opening ($37^1$) of the aforesaid stripping device. The gripping pincers, in the initial position thereof, are recessed relative to the means constituting the mechanism for putting the thread into shape for the product binding step. In the position of maximal projection, the jaws of the pincers extend beneath the stationary finger (10) and within the space which has been made free by the separation of the blades (13) (14) to reach the product to be gripped.

The device for gripping the product to be bound is to be described now, said device completing the machine and being at a second station laterally displaced from the first station. This device is illustrated more particularly in FIG. 2 of the drawings, wherein a loading sole (26) has been shown as comprising a horizontal base ($26^1$) and two vertical bodies ($26^2$) which are parallel one with another, internally hollow and open at their upper ends for the positioning and the angular clearance of rollers (29a–29b) actuated by pressure cylinders (30). The upper portion of these bodies is provided moreover with a "V"-shaped opening (26c) capable of receiving the portion not filled with meat of the casing constituting the string of fresh sausages, dry sausages or the like. However, the upper portion of these bodies ($26^2$) is provided with squares (28a–28b) situated within the axial extension of the "V"-shaped openings (26c) to support also the empty portion of the casing and the settling of the portion filled with meat, externally to the squares; a good holding of the casing is thus provided in order to facilitate the action of the gripping pincers (39), as will be described later.

The device for presenting the product is associated with driving means permitting said device to be moved in two directions, namely a first direction normal to the direction of movement of the thread-clamping device (2) and a second direction parallel with the direction of the latter device. For this purpose, the loading sole (26) can be moved under the control of a pressure cylinder (31) and along a rectilinear guiding within a supporting frame (33), in accordance with a movement corresponding to the first position. This rectilinear guiding is provided by parallel and cylindrical rods (32a–32b) disposed between the lateral sides ($33^1$) of said supporting frame. In accordance with a characteristic, this frame is open, and the longitudinal side ($33^2$) of said frame has a squared arm ($33^3$) arranged to accomodate a cutting blade (34), the squared arm ($33^3$) being located in front of the stroke end lateral side of the support (33). The longitudinal arm is disposed between the bodies ($26^2$) of the loading sole. It will be apparent that during the movement of translation of the sole (26), the portion of the casing situated between the rollers (29a) and (29b) is severed by the cutting blade (34). Upon termination of the translation, the portion of the casing situated between the clamping roller (29a) and the square (28a) is presented between the open jaws of the gripping pincers (39) when the latter is in the outlet position, as this will be described in a more detailed manner with the explanation of the complete operation of the machine.

The second movement of the loading sole, in the direction parallel with the direction of the thread-clamping device, is effected by means of a pressure cylinder (35) which is actuated to urge the supporting frame (33). The guiding is provided by the parallel and cylindrical rods (36a–36b) (36b) integral with the support (33) and sliding within the block (1e) integral with the framework (1) as illustrated in FIG. 2. The second movement of the loading sole permits the portion of the empty casing situated between the abutment roller (29b) and the square (28b) to be presented to the action of the gripping pincers (39).

In accordance with a further form of embodiment, not illustrated, the loading sole may be comprised of one body ($26^2$) only. It is possible to provide a control device for the various movements described above with sensors and in general all organs capable of treating the informations which are communicated to them. It is contemplated, optionally, that a thread-cutting blade and the actuating device thereof will be positioned in a suitable location, in order to act or not, after each binding step.

The operation of the machine will be set forth now in a complete manner, more particularly with reference to FIGS. 3 to 9 of the drawings.

The operational sequence includes two distinct main steps, corresponding successively: to the preparation of the knot, the squeezing of the meat within the casing, the placing of the knot around the casing and the tightening of the knot on the product to be bound, in a first step; and to the positioning and the cutting of the product to be bound, in the case of fresh sausages manufactured by the string, in a second step.

Figure 2:
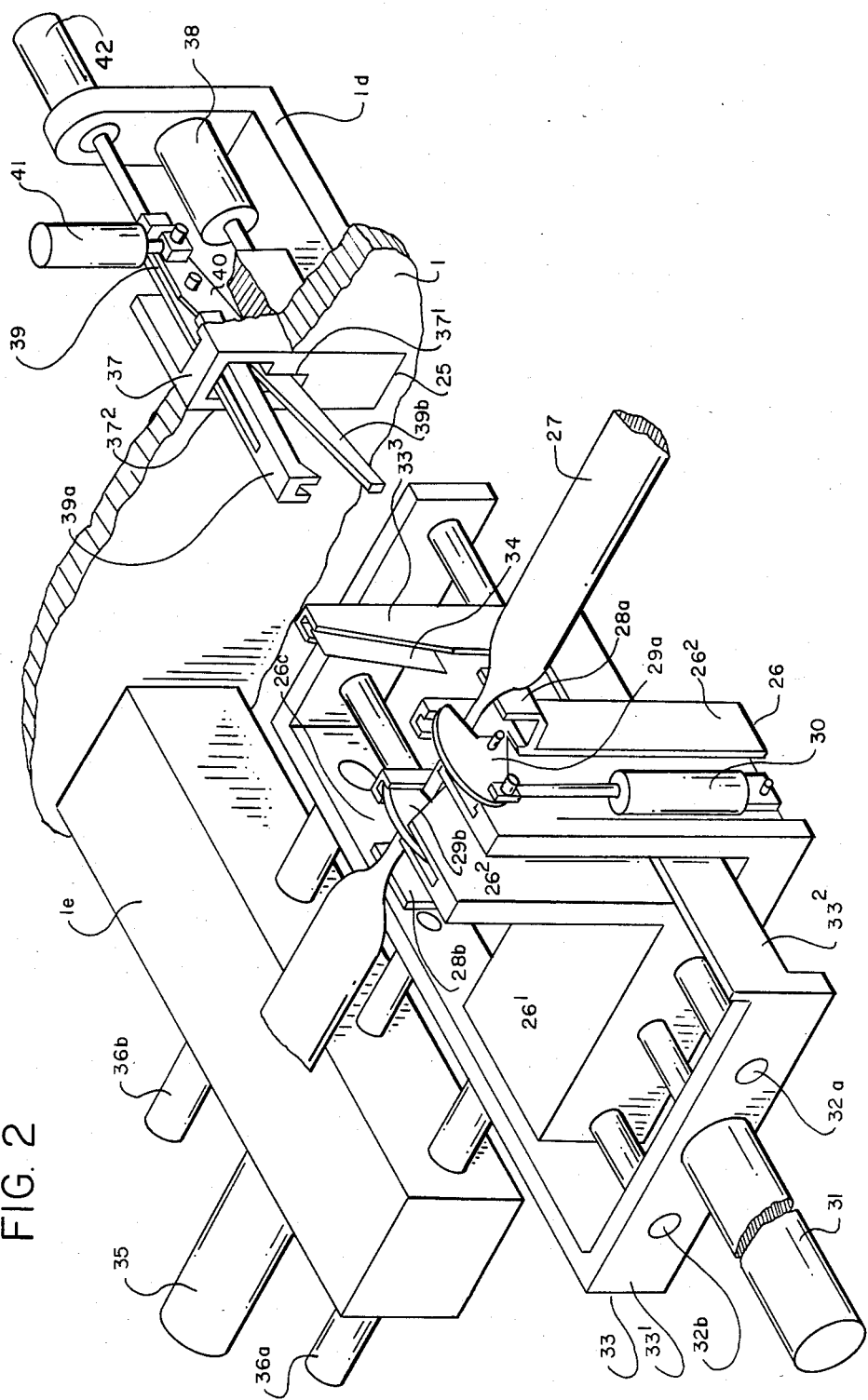
FIG. 2 is a perspective view illustrating the mechanisms complementary to the mechanisms in a second station illustrated in FIG. 1, namely the mechanisms for feeding the products to be bound and the mechanism permitting the stripping action to be performed.

(A) Preparation of the knot:

At the beginning of the operational sequence, after tightening of the preceding knot, the mechanisms of the automatic machine are illustrated in the position shown in FIG. 1. The strand of the thread (17) is engaged within the port (24a) of the wall (24). By the action of the pressure cylinder (23), the contoured plate (22) is pulled upwardly, the thread in abutment on the arm (22c) being moved through the oblong port (24a). On completion of its travel, the thread (17) is presented through the intermediary of the arm (22c) between the open jaws (2a-2b) of the thread-clamping device (2). This position is illustrated in FIG. 3. To permit the unwinding of the thread (17), the pressure cylinder (21) does not perform any action on the movable jaw (20a) relative to the stationary jaw (20b).

In the next step, an action is performed by the pressure cylinder (3) upon the movable jaw (2b) through which the thread (17) is clamped against the stationary jaw (2a). The thread-clamping device (2) is then moved transversely by the action of the pressure cylinder (4), unwinding the thread (17). With the contoured plate (22) remaining in the upper position, the thread is unwound along an approximately rectilinear path, said thread passing the organs (7, 8, 10, 11a, 11b) which constitute the mechanism permitting the loop for binding the product to be put into shape, as may be seen from FIG. 4.

In the next step, the pressure cylinder (9) is actuated to rotate the shaft (6) through the intermediary of the small rod (6a), and therefore the lifting fingers (7, 8) connected with the shaft (6). On account of their rearward tipping motion, the fingers (7, 8) grip the thread (17) while distorting the initial path thereof, within the same or approximately the same horizontal plane, the thread being maintained correctly within the "V" shape of said fingers. Further to this tipping motion, some portions of the thread (17) are abutted directly against the body of the small bars or hooks (11a-11b), and more particularly in a position situated approximately beneath the cylindrical bosses (11a1 and 11b3), as illustrated in FIG. 5.

In the next step, the pressure cylinder (12) is actuated in order to cause the small bars-hooks (11a-11b) to be moved downwardly. On account of this movement, the cylindrical bosses will be brought in contact with the underlying portions of the thread, while pulling the thread downwardly, modifying thus the path thereof in two points. On account of the relative position of the small bars (11a-11b) to the blades (13-14), the path of the thread portion resulting from the action of the small bar (11a) extends behind the blade (13), while the path of the thread portion resulting from the action of the small bar (11b) extends in front of the blade (14), as illustrated in FIG. 6. In the same Figure, the strands of thread which have been obtained are provided with reference numerals: (B1) is the strand of thread stretched between the lifting finger (8) and the cylindrical boss (11b3) of the small bar (11b); (B2) is the strand of thread stretched between the cylindrical boss (11b3) and the lifting finger (7); (B3) is the strand stretched between the lifting finger (7) and the cylindrical boss (11a1) of the small bar (11a).

Concerning the next step, as illustrated in FIG. 7, the blades (13) (14) are moved slidably relative to one another in an opposite direction by the action of their respective control means (15-16). The squared wing (14¹) of the blade (14) hooks up the strand of thread (B1) lying within the path of said blade, defining the strands (B1a and B1b). The strand (B2) disposed forwardly of the path relative to the strand (B1) and connecting the lifting finger (7) with the cylindrical boss (11b3) is moved forwardly by the action of the stationary finger (10) through the effect of the ramp (10¹) established on the front face of said finger. On the other hand, the squared wing (13¹) of the blade (13) hooks up the strand (B4) situated ahead of the cylindrical boss (11a1) of the small bar (11a), said strand (B4) lying in the path along which the blade is shifted. The strand (B3) connecting the lifting finger (7) with the cylindrical boss (11a1) is lying rearwardly on account of the action of the lifting finger.

In the next step, illustrated in FIG. 8, the blade (13) arrives at the end of its travel. The squared wing (13¹) penetrates by means of its recess (13³) into the unhooking nose (43) secured to the framework (1). This nose (43) presents its front portion which forms a ramp (43¹) on which the pulled thread (17) is abutting while being progressively cleared from the squared wing (13¹) of the blade (13). As the thread is not retained any more, a slight pull on the strand coming from the ball (18) will be sufficient to make this strand free. During this step, the gripping pincers (39) disposed within the stripping block (37) are moved forwardly by the action of the pressure cylinder (42). During this movement, the pincers, the jaws of which are spaced apart, are passed through the entanglement or interlacing of the strands (B1a) (B1b) (B2) (B3) (B4), as may be seen from FIG. 8.

In essence, the thread or strand 17 is intermittently advanced in the rectilinear direction of arrow L from upstream to downstream. As is seen in FIG. 6 the strand 17 is displaced laterally from the rectilinear direction by hooks 11a and 11b to form an upstream loop M and a downstream loop N, which loops are laterally displaced from one another as they pass over blades 13 and 14. The upstream loop M has a trailing leg (B⁴) and a leading leg (B³), while the downstream loop N has a trailing leg (B²) and a leading leg (B¹). In order to form the strand surrounded area (P) of FIGS. 7 and 8, the trailing leg (B⁴) of the upstream loop M is displaced in the downstream direction (arrow L) while the leading leg (B¹) of the downstream loop N is displaced in the upstream direction (arrow T). After the empty portion 27c of the casing 27 is inserted into the strand surrounded area P, the strand 17 is pulled by arm 22b. This collapses the strand surrounded area P and tightens the strand surrounded area to form the capstan knot.

(B) Squeezing of the meat in the casing, placing of the knot on the latter and tightening of the knot on the product to be bound.

Concerning FIG. 8, there is illustrated here the positioning of the portion of the casing not filled with meat on the loading device (26) after shifting of the latter, in order to present said casing portion between the open jaws of the gripping pincers. It will be reminded that these pincers are in the position of maximal development further to the action of the pressure cylinder (42). The pressure cylinder (41) is then caused to actuate the linkage of the movable jaws of said pincers in order to close said jaws; the portion of the casing being then clamped between the jaws (39a-39b). At the same time or successively, the roller (29a) of the loading device, illustrated more particularly in FIG. 2, make free the product to be bound. The pressure cylinder (42) acting upon the gripping pincers (39) is retracted, moving the pincers back near the initial position thereof in the interlacing area of the strands, as well as the product to be bound, (27a), which is thus separated from the next product (27b) loaded on the loading device. It will be reminded, as illustrated in FIG. 8 of the drawing, that the gripping pincers (39) had been shifted hermally to the direction of the thread-clamping device (2). When this is effected, the pressure cylinder (38) is actuated to cause the stripping block (37) to be shifted, said block providing then a double function, by acting on the one hand upon the product to be bound, and on the other hand upon the interlacing of the strands of the thread. The action upon the product to be bound is performed in the following manner: on account of the relative shifting of the stripping block (37) with respect to the gripping pincers (39), the product to be bound is gripped securely between the jaws of said pincers and is engaged partly by the empty portion (27c) thereof not filled with meat within the opening (37¹) provided in said stripping block. Consequently the neck of the product to be bound is firmly abutted on the front face (37²) of said block. This action in conjunction with the pulling stress of the gripping pincers on the end of the casing results in the squeezing in the interior of said casing.

The action upon the interlacing of the strands is performed in the following manner:

the pressure cylinder (9) is actuated in the direction of the development of the rod thereof, causing thus the shaft (6) to be rotated and the lifting fingers (7-8) to be returned in the initial position, whereby said fingers, on account of the slanted contour thereof, do not retain the strands of the thread any more, while making them free. On the other hand, the stripping block (37), on account of the forward shifting thereof, is urging by its front face the strands of the thread and moves them while clearing them from their position established below the clyindrical bosses (11a1) and (11b1) of the small bars (11a) and (11b), and from the squared wing (14¹) of the blade (14), in order to make them free. This step is illustrated in FIG. 9 of the drawings, wherein there may be seen the strands of the thread placed around the object to be bound.

The next step consists in performing the tightening of the binding which has been thus placed. For this purpose, the pressure cylinder (21) is actuated, the rod thereof being moved thereby and causing the movable jaw (20a) to be shifted in abutment upon the stationary jaw (20b), so that the thread (17) will be clamped while its unwinding is interrupted. The pressure cylinder (23) is then actuated and the rod thereof urges downwardly the plate (22) the cylindrical boss (22a) of which is pressed upon the thread (17), extending thereby the path of the thread and causing therefore the knot to be tightened.

There will be described now the second operational step for positioning and cutting the product to be bound, for instance in the case of fresh sausages manufactured by the string.

Prior to loading, the loading sole is disposed in the position illustrated in FIG. 2, i.e. the pressure cylinders (31) and (35) are in the retracted position. The rollers (29a–29b) are in the open position in order to permit the subsequent positioning of the empty portion of casing. After the filling, the casings include sections filled with meat and other sections not filled with meat, determining thus the length of the fresh sausages. The portions not filled with meat are introduced within the "V"-shaped openings (26c) provided in the body (26²) of the loading sole, so that the necks formed by the fresh sausages, between the empty portions, will be abutted against the squares (28a) and (28b) established in the lateral extension of the bodies, the portion not filled with meat of the casing being thus maintained firmly and securely. This portion, after having been thus positioned, is now clamped by the rollers (29a) and (29b) positioned by the pressure cylinders (30). The pressure cylinder (31) is then actuated to shift forwardly the loading sole (26) within the interior of the supporting frame (33), according to a direction normal to the travelling path of the thread. During this translation, the casing is severed by the cutting blade (34) in the area situated between the rollers (29a) and (29b), the severed portions of the casing being however still clamped by said rollers. On completion of the translation, the portion of casing situated between the square (28a) and the roller (29a) is presented between the open jaws of the gripping pincers (39) which has been advanced by the action of the pressure cylinder (42). The casing is then gripped between the aforesaid jaws and clamped, while at the same time the roller (29a) is opened by the pressure cylinder (30), the casing being thus made free. The roller (29b) remains in its position for clamping the next product to be bound. As illustrated in FIGS. 2 and 9, the casing (27a) is driven and bound in the manner described previously. After the tightening of this casing (27a) and during the stage leading to the preparation of the next knot, the pressure cylinder (35) is actuated and causes the supporting frame (33) as well as the associated loading sole (26) to be moved in a direction parallel with the unwinding path of the thread (17), and therefore normal to the first movement of the loading sole.

On completion of the next sequence, when the gripping pincers (39) are moved forwardly by the action of the pressure cylinder (42), the empty portion of casing situated between the square (28b) and the roller (29b) is presented between the jaws of said pincers (39) gripped and driven back into the stripping block (37), the roller (29b) having been opened previously to make the product free. The operations of squeezing, stripping and knot-tightening are then performed in accordance with the operational steps which have been described above. At the same time, the pressure cylinders (31) and (35) are actuated to bring back in the initial position the loading sole for a further sequence.

The advantages will be apparent from the invention, and a feature to be pointed out more particularly is the automatism as described, making it possible to bind very quickly solid or hollow products of any kind.

A programming cabinet, not described, has been contemplated for the machine, on the basis of the operations performed. A form of embodiment of the machine has been described, but many alternatives are possible which are mere engineering equivalents of the mechanisms described.

Figure 10:
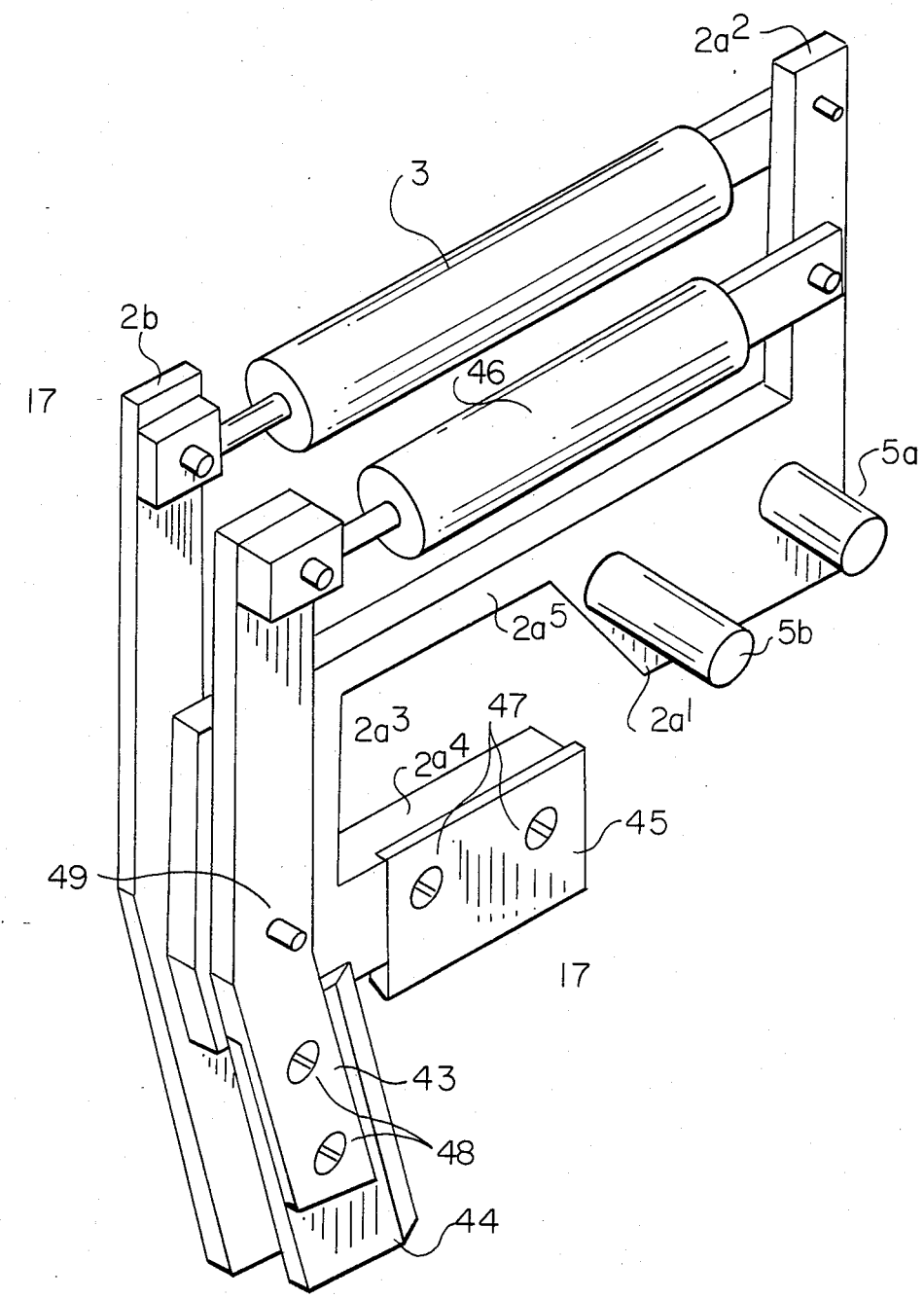
FIG. 10 is a perspective view illustrating the adaptation of the thread cutting mechanism with the thread bringing mechanism.

The clamping mechanism associated with the thread-cutting mechanisms has been illustrated in FIG. 10. The same means have been denoted by the same numerals.

The thread-clamping mechanism (2) includes a stationary jaw (2a) and a movable jaw (2b). The contoured stationary jaw (2a) includes a medial portion (2a1) extended on one side and within the same plane by a section (2a5) of lesser width and by a wing (2a3) with a horizontal and backward turned extension (2a4) defining the jaw part. The medial portion (2a1) is arranged for accomodating the rods (5a–5b) and the rod (4a) for controlling the motion of the thread-clamping mechanism.

The movable jaw (2b) is in the form of a contoured part for juxtaposition on one of the faces of the wing (2a3) of the stationary jaw. The movable jaw (2b) is made fast at the upper portion thereof with the rod of the pressure cylinder (3), secured in turn by its fastening point to the upper wing of the stationary jaw.

In accordance with this alternative form of embodiment, a thread-cutting mechanism is mounted on the stationary jaw in the following manner:

A lever (43) is mounted hingedly by means of a pin (49) on the wing (2a3) of the stationary jaw, said lever being integral at the upper portion thereof with the rod (46$^1$) of a pressure cylinder (46) which is in turn connected by its fastening point to the upper wing (2a2 of the stationary jaw, preferably on the side opposite to a fastening point of the pressure cylinder (3). On the lower end of said lever (46) is inserted in a suitable manner a cutting blade (44) which is secured by means of milled screws (48) for instance. On the other hand, an additional cutting blade (45) is mounted fixedly on the stationary jaw part (2a4). It will be apparent therefore that the blades (44–45) will be drawn near one another by the development of the rod of the pressure cylinder (46), causing thereby the thread (17) to be severed.

The tying mode of the product to be bound may be programmed by connecting the feeding of this pressure cylinder to a pneumatic or electronic programmation. The cutting can take place at each binding, or at every two bindings, etc.

It will be noted that with this device, during the translation of the thread-clamping mechanism, the heads of the hooks (11a–11b) are passed through the recess provided between the parts (2a3–2a4–2a5) of the thread-clamping arrangement.

It is possible with this machine to bind by means of a thread, in accordance with a pre-determined schedule, any solid or hollow objects. A non-restrictive example of implementation has been described for the manufacture of fresh sausages, dry sausages and other similar products.

The invention is not limited in any way to the use nor to the form of embodiment of the various parts of the invention which have been more particularly described, and any alternative form of embodiment remains within the scope of the invention.

I claim:

1. An automatic machine for making "capstan knots" around casings filled with products such as sausage, bologna, or the like, wherein the casings have spaced, empty portions around which the "capstan knots" are formed, and wherein the he machine includes on a supporting frame, a knotting station; means for continuously supplying a strand of material for forming the capstan knot on the knotting station; means for continuously advancing the casings past the knotting station, and means for severing the casings through the empty portions thereof; the improvement characterized by:
   means for providing a continuous length of the strand to the knotting station;
   first means for gripping the strand at one location on the frame;
   second means for gripping the strand at another location on the frame;
   means for moving the second gripping means through the knotting station in a rectilinear direction while pulling the strand through the first gripping means to tension the strand;
   means at the knotting station for displacing portions of the strand laterally of the rectilinear direction to form upstream and downstream loops, each of which has a leading and trailing leg;
   means at the knotting station for displacing the upstream loop and downstream loop laterally of one another;
   means for displacing the trailing leg of the upstream loop in the upstream direction to define a strand surrounded area;
   means for inserting the empty portion of a severed casing into the strand surrounded area formed by the displaced strand;
   means for pulling the strand to collapse the stand surrounded area about the empty portion of the casing and to tighten the strand about the empty portion to form the "capstan-knot"; and
   means for severing the strand after the capstan-knot is formed.

2. The automatic machine of claim 1 wherein the means for severing the casing is positioned between the casing stream and the knotting station whereby the empty portions of the casings are severed as the empty portions move toward the knotting station.

3. An automatic machine for making capstan knots from a strand of material about a casing for products, wherein the products are distributed in rectilinear, spaced relation within the casing to define longitudinally spaced empty portions in the casing, the automatic machine comprising:
   a first station for forming the capstan knots about the casing with the strand;
   means for providing a continuous length of the strand to the first station;
   means for displacing the strand at the first station to form a strand surrounded area;
   a second station for handling the casing, the second station being displaced from the first station;
   means for positioning the casing with one of the empty portions thereof presented at the first station;
   means for moving the empty portion into the strand surrounded area;
   means for pulling the strand to collapse and tighten the strand surrounded area about empty portion so as to form the capstan knot;
   casing severing means for severing the casing through the empty portion; and
   means for severing the strand.

4. The automatic machine of claim 3 wherein the casing severing means is disposed between the first and second stations for severing the casing as the empty portion thereof moves toward the first station.

5. The automatic machine of claim 4 wherein the means for providing a continuous length of strand to the first station includes fixed holding means for gripping the strand upstream of the first station;
   moveable gripping means for gripping the strand downstream of the fixed holding means;
   means for moving the moveable gripping means through the first station in a rectilinear direction while holding the strand with the fixed holding means to tension the strand;

means at the first station for displacing portions of the strand laterally of the rectilinear direction to form upstream and downstream loops, each loop having a leading and trailing leg; and means at the first station for displacing the trailing leg of the upstream loop in the downstream direction while displacing the leading leg of the downstream loop in the upstream direction to thereby form the strand surround area.

6. The automatic machine of claim 5 further including means for displacing the upstream loop and downstream loop laterally of one another prior to displacing the trailing and leading legs of the loops.

7. The automatic machine of claim 3 wherein the means for providing a continuous length of strand to the fist station includes fixed holding means for gripping the strand upstream of the first station;

moveable gripping means for gripping the strand downstream of the fixed holding means;

means for moving the moveable gripping means through the first station in a rectilinear direction while holding the strand with the fixed holding means to tension the strand;

means at the first station for displacing portions of the strand laterally of the rectilinear direction to form upstream and downstream loops, each loop having a leading and trailing leg; and means at the first station for displacing the trailing leg of the upstream loop in the downstream direction while displacing the leading leg of the downstream loop in the upstream direction to thereby form the strand surrounding area.

8. The automatic machine of claim 7 further including means for displacing the upstream loop and downstream loop laterally of one another prior to displacing the trialing and leading legs of the loops.

* * * * *